United States Patent [19]

Stavinoha

[11] Patent Number: 4,993,467

[45] Date of Patent: Feb. 19, 1991

[54] TIRE BEAD TOOL

[76] Inventor: Raymond Stavinoha, 9005 FM 361, Richmond, Tex. 77469

[21] Appl. No.: 451,865

[22] Filed: Dec. 18, 1989

Related U.S. Application Data

[63] Continuation of Ser. No. 432,180, Nov. 6, 1989, abandoned.

[51] Int. Cl.$^5$ .............................................. B60C 25/06
[52] U.S. Cl. .................................................... 157/1.17
[58] Field of Search ..................... 157/1.17, 1.3, 1.1

[56] References Cited

U.S. PATENT DOCUMENTS 4,589,462 5/1986 Giles ................................. 157/1.17

Primary Examiner—D. S. Meislin

[57] ABSTRACT

A portable or field type tire bead breaker tool comprised of a body member, a jaw member and a bead breaker member where the body member and jaw member are actuatable to bring wedge elements on the body member in position between a tire wall and a tire rim wall proximate to a tire bead. The bead breaker member has a wedge shaped element which is initially disposed in a first position in alignment with the wedge elements on the body member for disposition with the wedge elements between a tire wall and a tire rim wall. The wedge shaped element is arranged to be pivoted independently of the wedge elements to a second position and displace the tire bead from the tire rim. The wedge shaped element thereafter is movable laterally and rotatively to a third position for displacing the tire bead entirely from the tire rim.

8 Claims, 3 Drawing Sheets

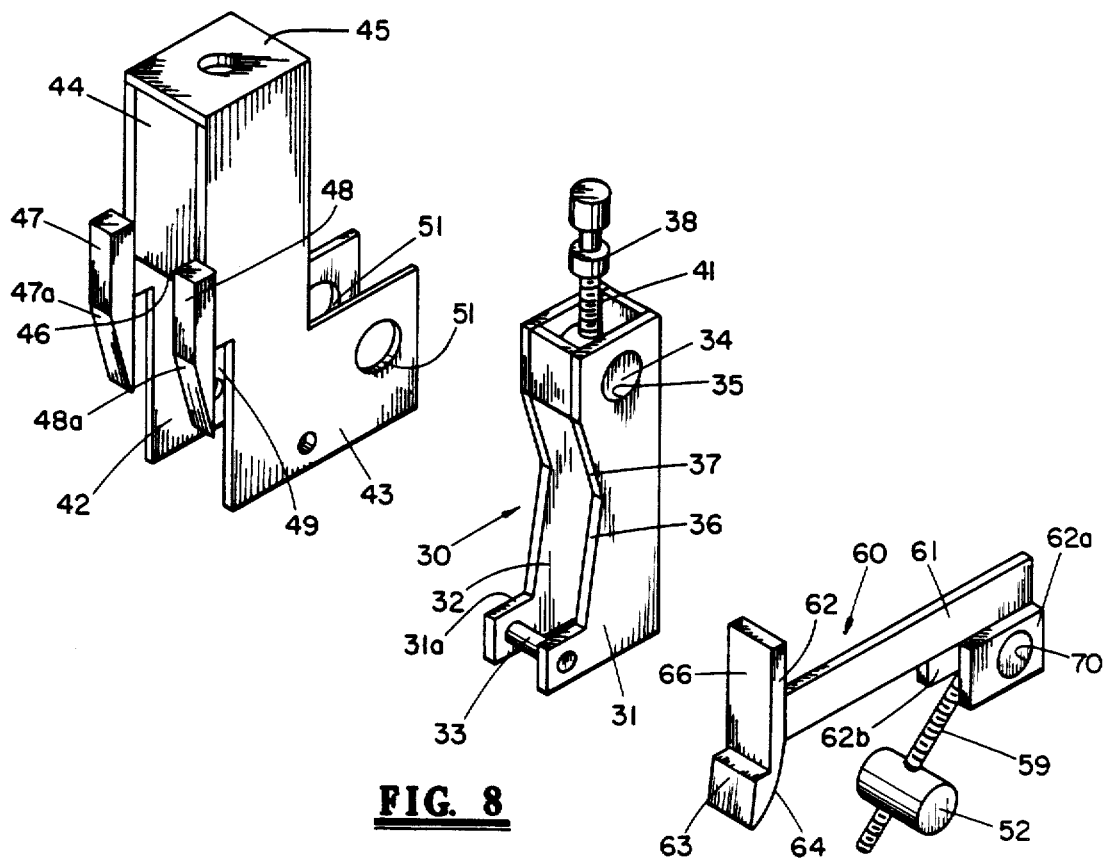
FIG. 8
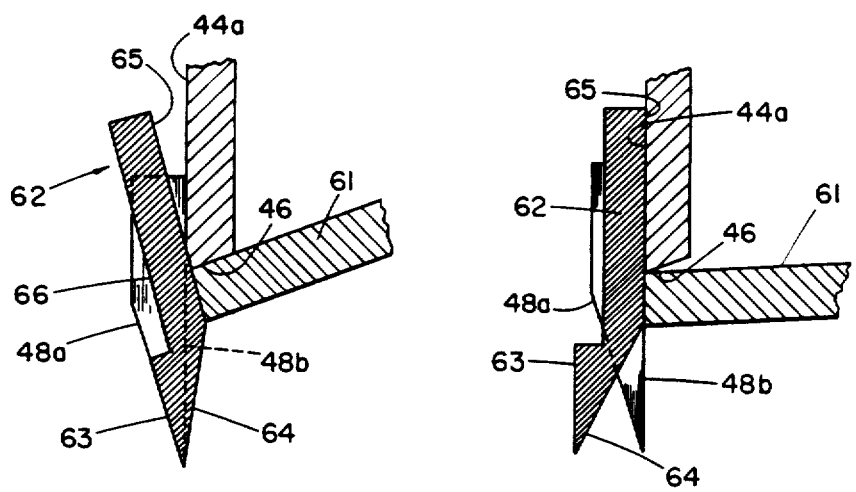
FIG. 9     FIG. 10

TIRE BEAD TOOL

This is a continuation of co-pending application Ser. No. 432,180 filed on Nov. 6, 1989, now abandoned.

FIELD OF THE INVENTION

This invention relates to tire bead breaking tools and more particularly to a tire bead breaking tool for heavy equipment tires.

BACKGROUND OF THE INVENTION

Bead breakers for separating a tire bead from a tire rim are well known. With respect to heavy equipment tires, a tire change is more often than not accomplished in a field or remote location from repair facilities because of the difficulty of transporting heavy equipment. For this reason, portable tire bead breakers ar in demand. Such portable tire bead breakers require portability and ease of use as well as reliability in breaking free a tire bead from a tire rim. As can be expected, a tire bead which is normally inflated with air pressure to seal with respect to a tire rim becomes very tightly engaged with a tire rim in heavy equipment over a period of time and use.

One of the problems with tire bead breakers is the inability to control the bead breaker with respect to the flexibility of the tire. For example, in U.S. Pat. No. 4,589,462, a bead breaker tool has a roller member which engages a tire rim and a jaw member which is inserted between a lip of a tire rim and a tire. The jaw member and roller member are pivotally coupled to one another and actuated by a manually operated screw member. The jaw member is slidably mounted in a frame member so that another screw member can move the jaw member laterally relative to a frame member. The problem with this device is that it often fails because the friction between the slidable jaw member and frame member is too great to overcome and because the jaw member often tends to exert a movement or force on the tire wall which is upward relative to a tire rim rather than inward so that the tire wall can be damaged before the type bead breaks.

Another device called a "Bead Buster" and sold by Gans Tire Co., Inc., 730 Eastern Ave., P.O. Box 22, Malden, Mass. 02148 involves a set of side-by-side wedge elements which are forced into place between a tire and a tire rim by hammer blows on a strike plate. Once positioned, a cam locking device is adjusted by an adjuster screw to orient the device at a position 90° to the rim. A cam device then locks the tool to the rim. A ratchet wrench operates a threaded member to move a set of wedge elements perpendicular to the tool. The tool suffers from friction when the threaded member is actuated which can only be alleviated by expensive load bearing ball bearings or the like. Additionally the tire, during the bead breaking operation, sometimes moves erratically which causes the tool to be forced off the rim or to puncture or damage the tire wall.

DESCRIPTION OF THE PRESENT INVENTION

The present invention involves a portable or field type tire bead breaker tool comprised of a body member, a jaw member and a bead breaker member where the body member and jaw member are actuatable by a threaded member to bring wedge elements on the body member in position between a tire wall and a tire rim wall proximate to a tire bead. The bead breaker member has a wedge shaped element which is initially disposed in a first position in alignment with the wedge elements on the body member for disposition with the wedge elements between the tire wall and the tire rim wall. The wedge shaped element is on a bar member and is arranged to be pivoted independently of the wedge elements to a second position and displace the tire bead from the tire rim by actuation of a threaded member. The threaded member is arranged to produce a component downward force on the wedge shaped element thereafter and to move the wedge shaped element laterally with a downward force applied the tire wall to move the wedge shaped element to a third position and displace the tire bead entirely from the tire rim.

DESCRIPTION OF THE DRAWINGS

FIG. 8 is a perspective view of the members of the tool of the present invention; and FIGS. 9 and 10 are partial views in cross section of the wedge members on a main body member with respect to a wedge element on a bead breaker member in two different operating positions.

DESCRIPTION OF THE PRESENT INVENTION

Figure 1:
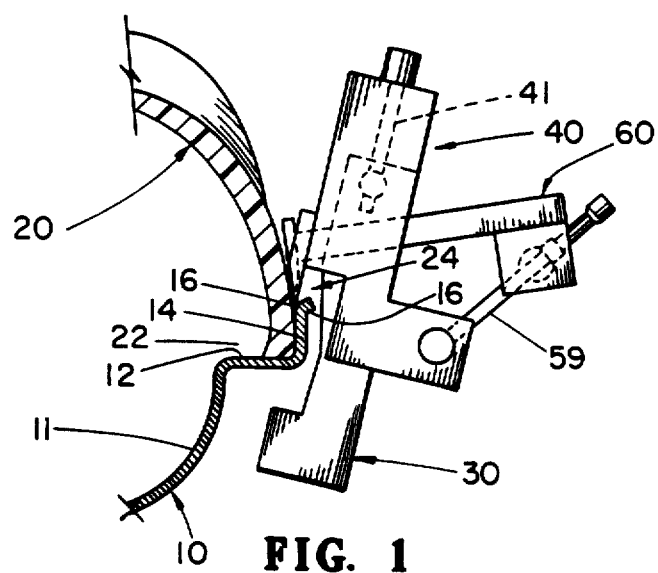
FIG. 1 is a schematic illustration of the position of the tool members when first positioned on a tire rim.
Figure 2:
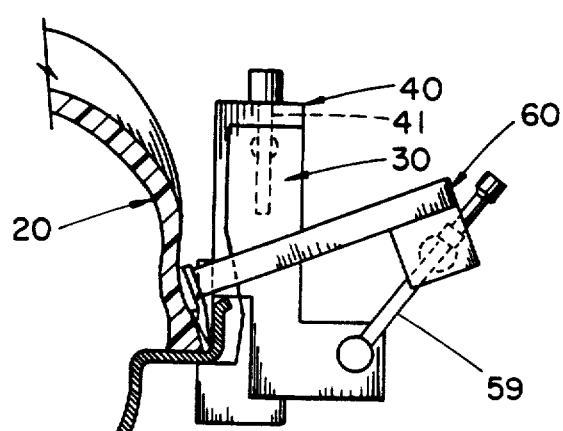
FIG. 2 is a schematic illustration of the position of the tool members when the jaw member and main body member are clamped to a tire rim.
Figure 3:
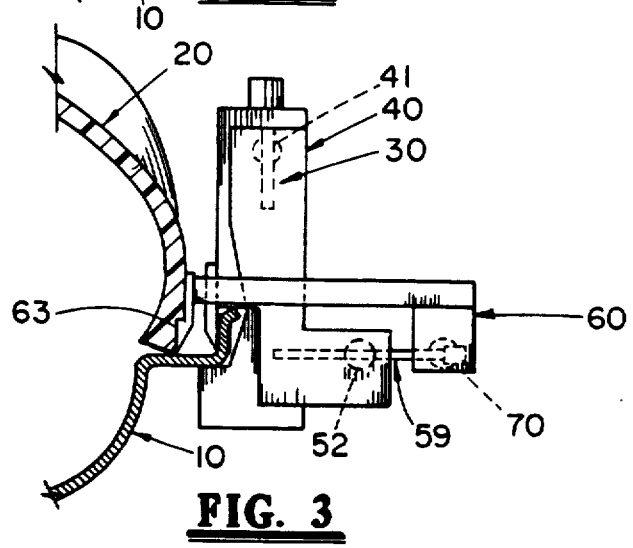
FIG. 3 is a schematic illustration of the position of the tool members when the tool is actuated to move a tire bead from a tire rim.

Referring now to FIGS. 1, 2 and 3, a schematic illustration is presented for different positions of the bead breaker tool of the present invention in respect to a tire bead breaking operation. A typical metal tire rim for a heavy equipment vehicle has a cross section with a central supporting section connected to an axle and has inner and outer rim sections extending outwardly from the central section. A typical outer metal rim 10 is illustrated in cross section in FIGS. 1-3 and includes a wall section 11 which joins a circularly shaped base section 12 about a horizontal axis for the axle. A vertical flange section 14 connects the base section 12 with a rounded-over, outer lip section 16.

A typical elastomer tire member 20 includes circular bead section 22 disposed about the horizontal axis for the axle where the bead section 22 has an outwardly projecting offset section 24 to engage with the lip section 16 of the tire rim 10. Thus, the tire member 20 has surfaces which engage the base section 12, the flange section 14 and the lip section 16 for sealing the tire relative to the tire rim. The offset section 24 of the tire member is sometimes formed with segmental notches located and spaced about its circumference, the notches being provided to facilitate access of a bead breaker tool to the joint or intersection between the bead section 22 and the flange section 14 for breaking a bead.

As shown in FIG. 1, the bead breaker tool is comprised of three main parts, a lower jaw member 30, a main body member 40 and a bead breaker member 60.

The main body member 40 is elongated and includes a pair of identically formed plate members 42,43 which are spaced apart from one another (see FIG. 8) so as to slidably receive the lower jaw member 30. (See FIGS. 4,5). The lower jaw member 30 is elongated and includes a pair of identically formed plate members 31,32 spaced apart from one another (see FIG. 8) so as to slidably receive the bead breaker member 60. (See FIGS. 6,7).

The lower jaw member 30 and the main body member 40 are generally arranged so that the lower jaw member 30 is telescoped within the frame of the body member 40. (See FIG. 4). A threaded member 41 extends through an opening in the main body member 40 and is threadedly received in a threaded pivot cylinder 34 in the lower jaw member 30. See FIGS. 4,5). The threaded member 41, when actuated, moves the lower jaw member 30 longitudinally either into or out of the main body member 40. The bead breaker member 60 which is slidably disposed in the jaw member 30 is movable in a direction generally transverse to the main body member 40 by means of a threaded member 59. (See FIGS. 6,7).

The general operation of the tool involves actuation of the first threaded member 41 to move aligned wedge surfaces 47a,48a on the main housing body 40 and wedge surfaces 63,64 on bead breaker member 60 into the joint between the tire and the tire rim. From this position the aligned wedge surfaces are moved downwardly between the bead section 22 of the tire and the flange section 14 of the tire rim. When the wedge surfaces of the tool are in the position shown in FIG. 2, the threaded member 59 is actuated to move the bead breaker member 60 rotatively and transversely relative to the jaw member and the main body member 40 and thereby break the seal between the tire bead and the tire rim.

Figure 4:
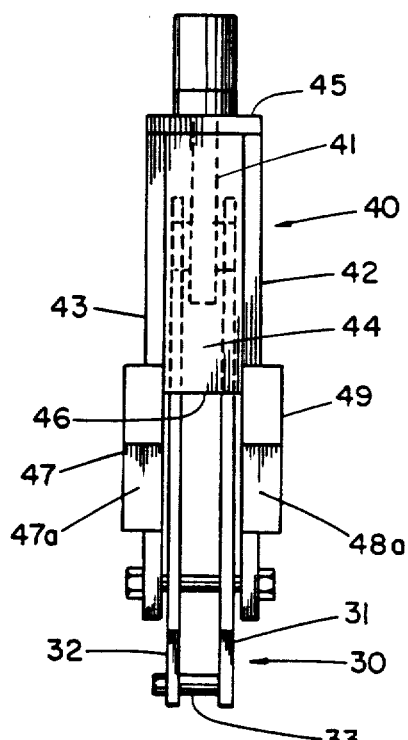
FIGS. 4 and 5 are respectively a front and side view of the jaw member and main body member only.
Figure 5:
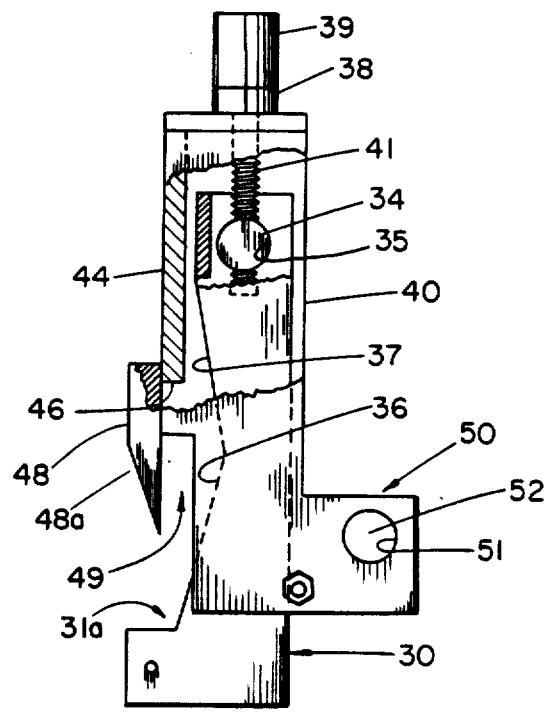

The structure to achieve the above functions is shown in FIGS. 4-10. In FIG. 4 and FIG. 5 only the main body member 40 and the lower jaw member 30 are illustrated for ease of explanation and clarity. The main body member 40 has elongated metal side plate members 42,43 which are welded to a front plate member 44. (See FIG. 8). The top ends of the plate members 42-44 are capped with a closure member 45 which also is welded to the plate members. The front plate member 44 terminates midway of the length of the plate members 42,43 at an abutment surface 46. The abutment surface can be beveled on the rear side. The three plate members 42,43,44 and the closure member 45 provide a rigid construction.

The main body member 40 has a pair of elongated wedge members 47,48 which are respectively welded to the edge surfaces of the plate members 42,43 at a location where the inclined wedge surfaces 47a,48a are located below the abutment surface 46. The wedge surfaces 47a,48a incline downwardly and inwardly with respect to the surface of the front plate member 44. Each of the plate members 42,43 are notched or cut away behind the wedge members to provide recesses 49 behind the wedge members 47,48 to accommodate a lip portion 16 of a tire rim when the wedge surfaces 47a and 48a are moved downwardly between a tire bead section 22 and a flange section 14.

Below the location of the wedge members 47,48, the plate members 42,43 are extended in a direction away from the location of the wedge members 47,48 to form a base location 50 for a pivot means. In the base location 50, the pate members 42,43 have aligned openings 51 which receive a pivot cylinder 52. The pivot cylinder 52 is rotatable in the openings 51. As will be explained hereafter the pivot cylinder 52 is threadedly connected to the threaded member 59. (See FIG. 7).

As shown in FIGS. 4,5 and 8, the lower jaw member 30 is formed by two spaced apart, elongated plate members 31,32. The plate members are attached to one another at a lower location by a bolt connection 33 and are attached by a welded plate member at an upper location. At the upper location, the pivot cylinder 34 is rotatably received in aligned openings 35 in the plate members 31,32. The plate members 31,32 are spaced so as to slide between the plate members 42,43 of the main body member 40 and to provide a central space or opening for the bead breaker member 60. At the lower end of each plate member 31,32 is a projection forming a jaw means 31a to engage the outer base section 12 of a tire rim while the wedge surfaces 47,48 separate the tire bead from a tire rim. Each of the forward faces of the plate members 31,32 has inclined surfaces 36,37 which form a relief surface or space to accommodate the tire rim projection when the jaw member 30 and the main body member become attached to a tire rim. See FIG. 2).

To move the jaw member 30 and the main body member relative to one another, the pivot cylinder 34 has a threaded bore to receive the threaded member 41. The threaded member 41 passes through an opening in the end closure member 45 and through an opening in a bearing means 38. The threaded member 41 terminates with a drive socket 39 which can be driven by a hand device or impact wrench. When operated, the threaded member 41 threads through the pivot cylinder 34 with the socket 39 rotatably resting on the bearing means 38. The threaded member 41 either moves the jaw means 31a toward or away from the wedge surfaces 47,48 depending upon the direction of rotation.

The jaw members 30 and main body member 40 are positionable on a tire rim as shown in FIG. 1. Actuation of the threaded member 41 forces the wedge members 47a,48a between the tire bead and the tire flange section 14 until the tips of the wedge members engage the wall of the tire rim. (See FIG. 2). To avoid binding with the tire rim, after contact, the wedge members can be backed off of direct contact with the tire rim.

Figure 6:
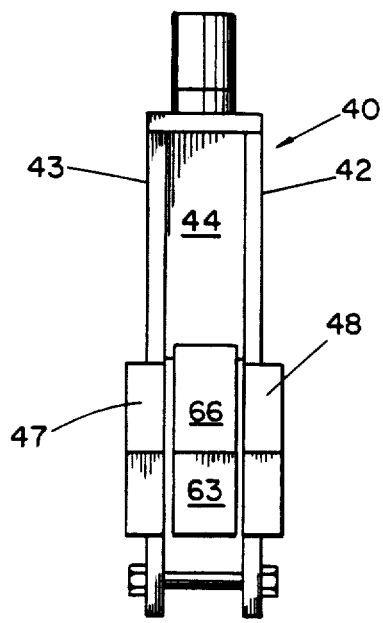
FIGS. 6 and 7 are respectively a front and side view of the bead breaker member and the main body member only.
Figure 7:
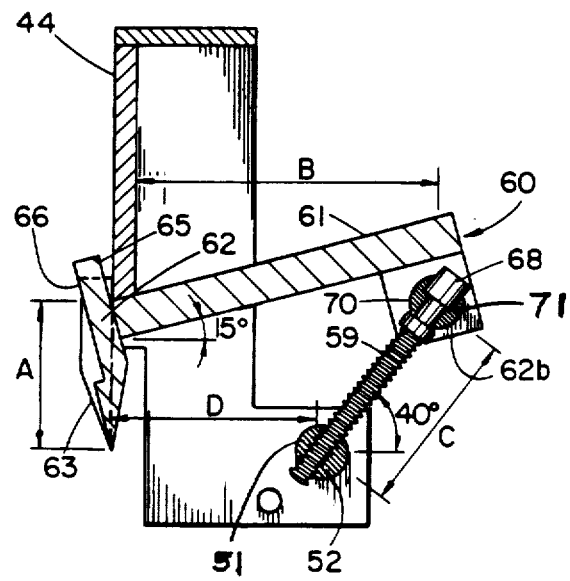

In FIG. 6 and FIG. 7 only the main body member 40 and the bead breaker member 60 are illustrated for ease of explanation and clarity. Referring now to FIGS. 6,7,8, the bead breaker member 60 includes an elongated bar member 61 which has a perpendicular wedge element 62 attached at one end. The wedge element 62 has forward and rearward flat surfaces 63,64 (see FIG. 9) arranged at an acute angle where the forward surface 63 aligns with the forward surfaces 47a,48a of the wedge members 47,48 when the bar member 61 engages the abutment surface 46 and a rearward surface 65 of the wedge member 62 engages the forward surface 44a of the plate member 44. See FIG. 9). The forward surface 63 of the wedge member 62 also adjoins a recessed surface 66 which is offset relative to the forward surface 63 (and may be inclined slightly outward relative to the surface 63) so that the offset section 24 of a tire can be accommodated and so that pressure on the tire surface is concentrated in the area of surface 63 in engagement with the tire wall. The rearward flat surface 65 in the first position of the bead breaker element shown in FIG. 9 is at an angle (about 15°) with respect to a rearward surface 48b of the wedge element 47. (See FIGS. 9,10). The surfaces 48b and 44a lie in a common plane. The angled rearward surface 64 assists in inserting the wedge members between a tire bead and a tire rim.

As shown in FIG. 7 and FIG. 8, at the other end of the bar member 61 are spaced apart pivot plates 62a,62b which are welded to the bar member 61 and which have openings 70 to receive the cylindrical pivot member 71. The pivot member 71 has a bore and a counter bore to rotatively receive a bearing member and the drive socket head 68 of the threaded member 59. The threaded member 59 is threaded through a threaded bore in the cylinder pivot member 52.

By actuating the threaded member 59 (by rotation) the bar member 61 is initially pivoted about the abutment surface 46 (see FIGS. 9 and 10) which causes the wedge surface 63 to push the tire bead away from the tire rim. The parting of the tire bead from the tire rim and the pivoting of the wedge surface 63 continues until the rear surface 65 of the wedge member 62 is moved away from the forward surface 44a of the plate member 44. Thereafter, continued rotation of the threaded member 59 causes the wedge member 62 to move transversely with respect to the main body member with the surface 64 applying pressure to the wall of the tire. The angle of the bar member 61 with respect to the horizontal changes and decreases from an initial angle of about 15° until the pivot centers of the pivot cylinders 71 and 52 are aligned on an axis perpendicular to the surface 64. As shown in FIG. 7, various dimensions are A=3⅜ inches; B=7 inches (to the center line for pivot 71); C=4⅛ inches (center to center) and D=3⅜ inches (to the center line of pivot 52). The dimensioning and positioning causes the member 61 to align the axis of the pivots 52,71 perpendicular to the pressure surface 63 so that the tire bead can be displaced while there is a minimum of friction between the bar member 60 and the main body 40.

After the tire bead is separated from the tire rim, the threaded members 41 and 59 are reversely rotated to release the tool from a tire rim.

It will be apparent to those skilled in the art that various changes may be made in the invention without departing from the spirit and scope thereof and therefore the invention is not limited by that which is enclosed in the drawings and specifications but only as indicated in the appended claims.

What is claimed is:

1. A tire bead breaker tool for separating a tire member from a tire rim comprising:
   an elongated main body member having spaced apart side wall sections, a forward wall section and an upper closure wall section, all connected together in an integral structure,
   a pair of spaced apart, elongated wedge members attached to said forward wall section, said wedge members having forward and rearward surfaces with the apex portions of said wedge members facing downward with respect to said upper closure wall section, and with the forward face of said wedge members facing toward a tire member, said wedge members being spaced outwardly from said body member sufficiently to accommodate a tire rim profile when said wedge members are disposed between a tire wall and a tire rim,
   an elongated jaw member having spaced apart side wall sections arranged to be movably disposed between said side wall sections of said main body member, said side wall sections of said jaw member being attached to one another at a lower end and having forward faces shaped to define upwardly facing jaw surfaces for engaging a tire rim surface when said wedge members are disposed in a first position between a tire wall and a tire rim, said side wall sections of said jaw member having vertical forward faces spaced inwardly relative to said jaw surfaces for accommodating a tire rim profile when said wedge members are disposed in said first position between a tire wall and a tire rim,
   first actuating means for moving said facing jaw surfaces toward and away from said wedge members,
   a bead breaker member having an elongated wedge element arranged transversely to an elongated bar element and attached thereto, said wedge element having a wedge shaped section facing downward toward said jaw surfaces, said bar element being disposed between said side wall sections of said jaw member,
   said forward wall section having a downwardly facing abutment surface located intermediate of the length of said wedge members so that said wedge shaped section can have its forward face aligned with the forward face of said wedge members and said bar member can be in engagement with said abutment surface in an initial operating location for said body and said bead breaker members, and
   second actuating means for initially pivoting said wedge shaped section relative to said wedge members about said abutment surface to a second location to separate a tire bead from a tire rim when said jaw member and said main body member are in said first position and for moving said wedge shaped section from said second location in a direction away from said wedge members to move a tire bead from engagement with a tire rim.

2. The tire bead breaker tool as set forth in claim 1 wherein said second actuating means includes an elongated threaded member threadedly coupling said main body member to said bead breaker member, said threaded member being angularly disposed relative to a plane through the axis of a tire rim so as to initially produce a downward and inward force on said wedge shaped section.

3. The bead breaker tool as set forth in claim 1 wherein said wedge shaped section of said bead breaker member has (a) forward and rearward (surface arranged to be) surfaces which are inclined relative to one another and where the rearward surface of said wedge shaped section is inclined outwardly relative to the rearward faces of said wedge members in said first position.

4. The bead breaker tool as set forth in claim 3 wherein said forward surface of said wedge shaped section has a recess for accommodating the side wall surface of a tire.

5. A tire bead breaker tool for separating a tire member from a tire rim comprising:
   an elongated main body member having spaced apart side wall sections, a forward wall section and an upper closure wall section, all connected together in an integral structure,
   a pair of spaced apart, elongated wedge members attached to said forward wall section, said wedge members having forward and rearward surfaces with the apex portions of said wedge members facing downward with respect to said upper closure wall section, and with the forward face of said wedge members facing toward a tire member, said wedge members being spaced outwardly from said body member sufficiently to accommodate a tire rim profile when said wedge members are disposed between a tire wall and a tire rim, an elongated jaw member having spaced apart side wall sections arranged to be movably disposed between said side wall sections of said main body member, said side wall sections of said jaw member being attached to one another at a lower end and having forward faces shaped to define upwardly facing jaw surfaces for engaging a tire rim surface when said wedge members are disposed in a first position between a tire wall and a tire rim, said side wall sections of said jaw member having vertical forward faces spaced inwardly relative to said jaw surfaces for accommodating a tire rim profile when said wedge members are disposed in said first position between a tire wall and a tire rim, first actuating means including a threaded member coupling said jaw member and said body member to one another for moving said facing jaw surfaces toward and away from said wedge members, a bead breaker member having an elongated wedge element arranged transversely to an elongated bar element and attached thereto, said wedge element having a wedge shaped section facing downward toward said jaw surfaces, said bar element being disposed between said side wall sections of said jaw member, said forward wall section having a downwardly facing abutment surface located intermediate of the length of said wedge members so that said wedge shaped section can have its forward face aligned with the forward face of said wedge members and said bar member can be in engagement with said abutment surface in an initial operating location for said body and said bead breaker members, and second actuating means including a threaded member coupling said bar element to said main body member for initially pivoting said wedge shaped section relative to said wedge members about said abutment surface to a second location to separate a tire bead from a tire rim when said jaw member and said main body member are in said first position and for moving said wedge shaped section from said second location in a direction away from said wedge members to move a tire bead from engagement with a tire rim, said threaded member being arranged relative to the axis of a tire rim so as to act inwardly upon said tire relative to said tire rim while said wedge shaped section moves between said first and second locations.

6. The tire bead breaker tool as set forth in claim 5 wherein said threaded member of said second actuating means is angularly disposed relative to a plane through the axis of a tire rim so as to initially produce a downward and inward force on said wedge shaped section.

7. The bead breaker tool as set forth in claim 5 wherein said wedge shaped section of said bead breaker member has (a) forward and a rearward (surface arranged to be) surfaces which are inclined relative to one another and where the rearward surface of said wedge shaped section is inclined outwardly relative to the rearward faces of said wedge members in said first position.

8. The bead breaker tool as set forth in claim 7 wherein said forward surface of said wedge shaped section has a recess for accommodating the side wall surface of a tire.

* * * * *